April 21, 1925.  1,534,862
F. MYERS
PNEUMATIC TIRE VALVE
Filed Aug. 14, 1923
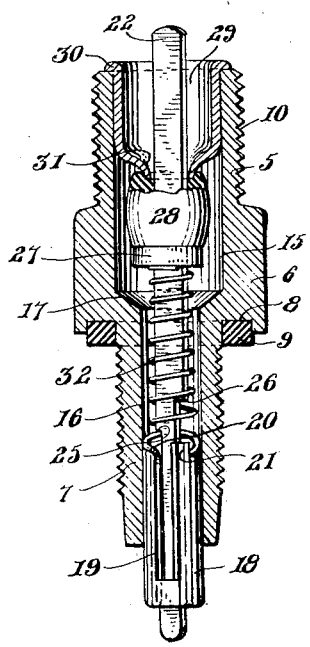
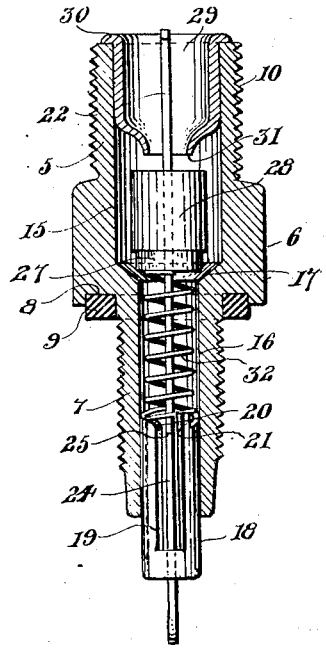
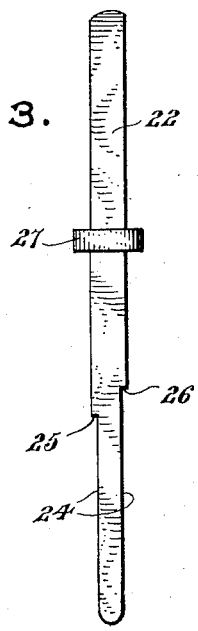
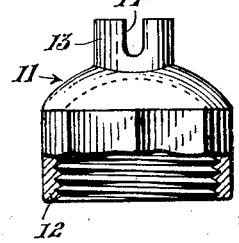
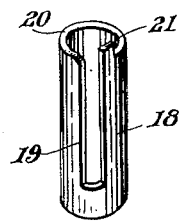
Inventor
Frederick Myers Patented Apr. 21, 1925.

1,534,862

UNITED STATES PATENT OFFICE.

FREDERICK MYERS, OF NEW YORK, N. Y.

PNEUMATIC-TIRE VALVE.

Application filed August 14, 1923. Serial No. 657,304.

*To all whom it may concern:*

Be it known that I, FREDERICK MYERS, a citizen of the United States of America, residing at New York, in the county of New York and State of New York, have invented certain new and useful Improvements in Pneumatic-Tire Valves, of which the following is a specification.

This invention relates to new and useful improvements in valves, and has particular reference to that type of valve associated with the inner tube of an automobile tire wherein the valve is automatically closed when an air pump is disengaged therefrom.

An important object of the invention is to provide a pneumatic tire valve of a suitable construction for providing resilient means for positioning the valve element against its seat, and additional mechanical means for insuring the seating of said valve and the retaining of it in that position.

A further object of the invention is to provide a pneumatic valve wherein the valve mechanism is adapted for being bodily removed from a stem casing to permit access to either end of the said mechanism.

Other objects and advantages of the invention will become apparent during the course of the following description.

In the accompanying drawing forming a part of this specification and in which like numerals are employed to designate like parts throughout the same, Figure 1 is a central longitudinal sectional view, partly in elevation, of the valve mechanism embodying this invention with the valve element in its operative position for preventing the passing of air through the said mechanism, Figure 2 is a similar view to Fig. 1 with the exception that the valve element is in its open position, Figure 3 is an elevational view of the valve stem employed as a part of this mechanism, Figure 4 is a detail perspective view of a locking sleeve employed, and Figure 5 is a detail elevational view, partly in section, of a valve cap that is employed with the mechanism shown in Figs. 1 and 2.

In the drawing, wherein for the purpose of illustration is shown the preferred embodiment of this invention, the numeral 5 designates a tubular casing that is adapted for housing the valve mechanism and is intended to be removably positioned within the outer end of an inner tube valve stem casing for the purpose of controlling the admission and exhaustion of air from the said tube. This tubular casing 5 is provided with an external wrench engaging surface 6 having an externally threaded axially arranged tubular extension 7 that is intended to threadedly engage the internal screw threads formed on an inner tube valve stem casing not shown. The external wrench engaging surface 6 is provided with an annular recess 8 in its lower face that is adapted for receiving the rubber gasket 9 which is intended to prevent the escapement of air between the valve mechanism casing and the valve stem casing. The tubular valve mechanism casing 5 is externally screw threaded, as at 10, for threadedly receiving the valve cap 11 shown in Fig. 5. This valve cap is provided with an octagon-shaped internally threaded portion 12 and a reduced boss 13 at its opposite end that is provided with a transversely extending slot 14 which is suitable for accomplishing a specific purpose that will be described in detail at a later point.

It will be seen by inspecting Figs. 1 and 2, that the tubular valve mechanism casing 5 is provided with an axially extending bore 15 while the tubular extension 7 is provided with a bore 16 that is in axial alinement with the bore 15 and is of lesser diameter. A cone-shaped shoulder 17 is provided between the bores 15 and 16 and is adapted for performing a function that will be described at a later point.

The valve mechanism consists of a locking sleeve 18 that is positioned within the lower end of the bore 16 and projects a suitable distance outwardly thereof. This sleeve 18 is provided with a longitudinally extending slot 19 that terminates inwardly of the lower end of the same, as shown. The upper edge of this locking sleeve 18 is provided with a camming surface 20 having its highest point positioned diametrically opposite the slot 19. There is also provided a stop shoulder 21 that is formed upon the upper edge of the locking sleeve 18 adjacent one edge of the slot 19. In Figs. 1 and 2, the locking sleeve 18 is shown protruding downwardly from the tubular extension 7 with a portion of the slot 19 exposed below the lower end of this extension. The opposite longitudinal edges of the said stem are provided with cutout portions 24 that are of different lengths for providing the longitudinally spaced shoulders 25 and 26. It will be seen by inspecting Figs. 1 and 2, that this valve stem 22 is of flat formation which will adapt the same for being formed by a stamping operation. The upper relatively wide portion of the valve stem 22 is provided with a collar 27 that is rigidly connected to the said stem. Slidably positioned upon the valve stem 22 and normally resting upon the collar 27 is a cylindrically-shaped valve element 28 that is preferably formed from rubber or the like. Permanently positioned within the bore 15 of the valve mechanism casing 5 is a cup-shaped element 29 that is provided at its upper edge with an annular outwardly directed flange 30 adapted for resting upon the upper edge of the valve mechanism casing 5 while the inner end of this cup-shaped element 29 is reduced in diameter for the purpose of providing a valve seat 31. It is to be understood that this cup-shaped element 29 is permanently secured in the bore 15 by any suitable means. For the purpose of forcing the cylindrically shaped valve element 28 against the seat 31, there is provided a spiral spring 32 that encircles the valve stem 22 below the fixed collar 27 and is adapted to bear against the latter. The lower end of the spring 32 is intended to engage the shoulder 21 which is carried by the fixed collar 18.

It will be seen by this construction that the valve spring 32 will normally retain the valve element 28 against the seat 31 and that the force of the spring will cause the cylindrically-shaped valve 28 to slightly bulge or buckle for causing a tighter seal to be established between the said valve and the seat. It will be seen that the lower end of the valve stem with the cutout portions 24 formed in the longitudinal edges of the same are slidably positioned within the locking sleeve 18. The shoulder 25 formed by one cutout portion 24 is adapted for engaging the camming surface 20 formed upon the upper edge of the locking sleeve for the purpose of providing additional means for forcing the cylindrically-shaped valve element 28 against the valve seat 31 and for locking the same in its closed position. The rotating of the valve stem 22 for causing the shoulder 25 to ride upon the camming surface 20 is accomplished by inserting the boss 13 carried by the valve cap 11 into the cavity of the cup-shaped element 29 with the transversely extending groove 14 formed in the said cap engaging the upper end of the valve stem. When it is desired to force air through the valve mechanism, the cap 11 is employed for rotating the valve stem until the shoulder 25 is positioned in longitudinal alinement with the slot 19 formed in the locking sleeve 18. The valve stem may then be forced inwardly by the air pressure from the air pump connection thus unseating the valve elements 28. It will be seen that when the shoulder 25 is positioned in longitudinal alinement with the slot 19, the shoulder 26 is positioned directly above the highest part of the camming surface 20. This shoulder 26 will engage the highest portion of the camming surface 20 for preventing too great an inward movement of the said valve stem and the valve.

In assembling this valve mechanism, the locking sleeve 18 is placed in the inner end of the valve casing with its end projecting therefrom. The collar 27 is positioned upon the stem 22 and the valve element 28 placed upon the stem against the upper face of the collar. The valve stem 22 is passed through the spiral spring 32 and the whole mechanism is then placed within the casing through the outer end of the same. The cup-shaped element is then passed over the outer end of the stem and firmly pressed down into the upper end of the casing with the flange 30 engaging the end thereof.

The positioning of the locking sleeve 18 with a portion of the longitudinally extending slot 19 below the lower end of the extension 7 allows for the passage of air through this exposed portion of the slot. It is now believed that the construction, manner of assembly, and mode of operation of this valve mechanism is completely disclosed by the above detail description.

The cone-shaped shoulder 17 positioned between the bores 15 and 16 is purposely formed by the drill used to cut the bore 15 for aiding in centering the tool employed for cutting the bore 16. It is further formed for permitting unrestricted inward movement of the collar 27, carried by the valve stem 22, without weakening the wall of the casing by too closely associating the annular recess 8 with the inner end of the bore 15 and further to permit air to freely enter the bore 16 from the larger bore.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a pneumatic tire valve, a tubular casing, a cup-shaped element forced into the bore of the tubular casing, said cup-shaped element having an opening provided with a depending annular flange of less diameter than the bore of the tubular casing for forming a valve seat, a valve stem slidable through the opening of the cup-shaped element, a cylindrical valve formed of resilient material carried by said stem, and means for forcing the valve against the edge of the flange valve seat for causing the valve to be deformed for overlapping the outer face of the flange to provide a better seal 2. In a pneumatic tire valve, a tubular casing, a valve seat within the bore of said casing, a valve stem slidable within said casing, a valve on said stem, a locking sleeve within the bore of the casing, a cam edge formed on said sleeve, a shoulder formed at one end of said cam edge, a spring engaging said shoulder and said valve for forcing the latter onto its seat, and a shoulder projecting from said valve stem adapted to engage said cam edge for positively wedging the valve against said seat.

3. In a pneumatic tire valve, a tubular casing, a valve seat within the bore of said casing, a valve stem slidable within said casing, said stem having a pair of longitudinally spaced shoulders, a valve on said stem, a locking sleeve within the bore of the casing, said sleeve having a longitudinal slot, a cam edge formed on said sleeve adapted to be engaged by one of the shoulders on said stem for locking the valve on its seat and to be engaged by the other shoulder on said stem for limiting the unseating movement of said valve, and resilient means for normally holding said valve seated.

In testimony whereof I affix my signature.

FREDERICK MYERS.